United States Patent
Pornprasertsuk et al.

(10) Patent No.: US 7,455,722 B2
(45) Date of Patent: Nov. 25, 2008

(54) ION IRRADIATED ELECTROLYTE MEMBRANE, ANODE, AND/OR CATHODE

(75) Inventors: Rojana Pornprasertsuk, Palo Alto, CA (US); Jeremy Cheng, Longmeadow, MA (US); Yuji Saito, Tokyo (JP); Friedrich B. Prinz, Woodside, CA (US)

(73) Assignees: Honda Motor Co., Ltd, Tokyo (JP); The Board of Trustees of the Leland Stanford Junior University, Palo Alto, CA (US)

( * ) Notice: Subject to any disclaimer, the term of this patent is extended or adjusted under 35 U.S.C. 154(b) by 99 days.

(21) Appl. No.: 11/487,176

(22) Filed: Jul. 14, 2006

(65) Prior Publication Data

US 2007/0022878 A1    Feb. 1, 2007

Related U.S. Application Data

(60) Provisional application No. 60/702,786, filed on Jul. 26, 2005.

(51) Int. Cl.
*B01D 53/22*    (2006.01)

(52) U.S. Cl. .......... 96/4; 96/11; 95/54; 429/12; 429/30; 429/33

(58) Field of Classification Search .......... 96/4, 96/11; 95/45, 54; 429/12, 30, 33
See application file for complete search history.

(56) References Cited

U.S. PATENT DOCUMENTS

| | | | | |
|---|---|---|---|---|
| 5,731,097 | A * | 3/1998 | Miyashita et al. | 429/30 |
| 6,623,881 | B2 * | 9/2003 | Badding et al. | 429/30 |
| 6,632,554 | B2 * | 10/2003 | Doshi et al. | 429/30 |
| 2004/0038106 | A1 * | 2/2004 | Saito et al. | 429/33 |
| 2004/0072045 | A1 * | 4/2004 | Kuromatsu et al. | 429/33 |

* cited by examiner

*Primary Examiner*—Jason M Greene
(74) *Attorney, Agent, or Firm*—Lumen Patent Firm

(57) ABSTRACT

Solid oxide fuel cells selectively transport oxygen ions through an electrolyte membrane. The maximum oxygen ion transport rate limits the power density of the fuel cell. By ion irradiating the electrolyte membrane and/or the cathode, the oxygen adsorption, dissociation, and incorporation rates can be improved, leading to higher ion transport rates and better fuel cell performance.

20 Claims, 7 Drawing Sheets

Oxygen Adsorption

Oxygen Adsorption

Oxygen Dissociation

Oxygen Incorporation

Oxygen Adsorption

Oxygen Dissociation

Oxygen Incorporation

Oxygen Adsorption

Oxygen Dissociation

Oxygen Incorporation

Oxygen Adsorption

Oxygen Dissociation

Oxygen Incorporation

ION IRRADIATED ELECTROLYTE MEMBRANE, ANODE, AND/OR CATHODE

RELATED APPLICATIONS

This application claims priority under 35 U.S.C. §119(e) to provisional application No. 60/702,786 filed on Jul. 26, 2005 titled "Ion Irradiated Electrolyte Membrane."

FIELD

The invention relates to solid oxide fuel cells, and, more particularly, to ion irradiated electrolyte membranes, ion irradiated anodes, and/or ion irradiated cathodes.

BACKGROUND

Solid oxide fuel cells are a type of fuel cell where oxygen ions pass through an electrolyte membrane. For these types of fuel cells, the electrolyte membrane is usually a solid ceramic. The ion conducting properties of prior art membranes usually does not begin until fairly high temperatures, on the order of 800° C. This document describes the fabrication of highly efficient solid oxide fuel cells with a thin film electrolyte and electrode structure.

A solid oxide fuel cell can be manufactured using standard photo lithographic techniques. These techniques allow for fairly precise construction. Given the availability and precision of the equipment, a solid oxide fuel cell with a thin layer electrolyte membrane can be constructed. Depending on the material of the membrane, the ion conductivity of the membrane goes up as the thickness of the membrane goes down. Unfortunately, with prior art very thin film membranes, the structural integrity of the solid oxide fuel cell can be compromised.

By using a Yttria Stabilized Zirconia (YSZ) or a Gadolinia-Doped Ceria (GDC), a thin film membrane on the order of 50 nm can be manufactured and operated successfully. The GDC membrane fuel cell can operate around 300° C., which is a very low operating temperature for a solid oxide fuel cell. The YSZ membrane fuel cell has a higher operating temperature, but can offer better ion conductivity than the GDC fuel cell at the same temperature.

SUMMARY

By ion irradiating either the electrolyte membrane, the cathode, or both, the oxygen adsorption, oxygen dissociation, and oxygen incorporation may be beneficially increased.

DESCRIPTION

Figure 1A:
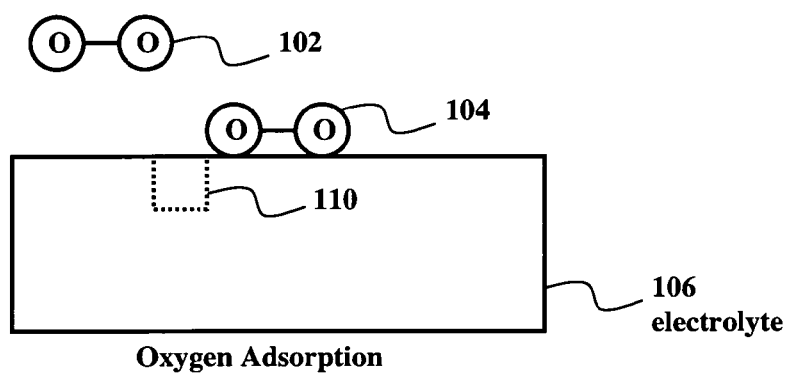
FIGS. 1 A-C show examples of oxygen adsorption, dissociation and incorporation.

By ion irradiating the electrolyte membrane, the oxygen adsorption, oxygen dissociation, and oxygen incorporation has been observed to increase. This can lead to the reduction of the activation polarization loss of the electrolyte surface. Activation polarization is a term used to describe the reduction of fuel cell efficiency (performance) due to low oxygen adsorption, oxygen dissociation, and oxygen incorporation rate. It is also possible to see an improvement by irradiating both the electrolyte layer and one or more of the electrode layers (anode and/or cathode), or even irradiating only one of the electrode layers. LSCF and LSM are examples of suitable electrode materials that can be irradiated. Irradiation may be accomplished with Xe and/or Ar ions. The irradiated electrolyte and/or irradiated electrodes are suitable for use in a fuel cell or a gas sensor.

The cathode is one of the essential components in solid oxide fuel cell (SOFC). The conventional cathodes which have been used in solid oxide fuel cell nowadays are doped lanthanum ferrite such as (Sr—Co) doped $LaFeO_3$ (LSCF) and doped lanthanum manganate such as Sr doped $LaMnO_3$ (LSM). LSM is a commonly used cathode for high temperature fuel cell operating at temperatures higher than 800° C. LSCF was reported to yield high ionic and reasonable electronic conductivities at temperatures between 600-700° C. Therefore, it can be used in an intermediate operating temperature solid oxide fuel cell. However, in order to fabricate low temperature solid oxide fuel cells (operating temperature lower than 300° C.), the ionic and electronic conductivity cathode of solid oxide fuel cell needs to be improved.

At the cathode or electrolyte membrane there are several reactions: oxygen adsorption, oxygen dissociation, and oxygen incorporation. These reactions are shown below in Eqs. 1-3:

Oxygen adsorption $$O_{2(g)} + S_{ad} \leftrightarrow O_{2(ad)} \tag{1}$$

Oxygen dissociation $$O_{2(ad)} + 4e^- \leftrightarrow O_{(ad)}^{2-} \tag{2}$$

Oxygen incorporation $$O_{(ad)}^{2-} + V_O^- \leftrightarrow O_O^x + S_{ad} \tag{3}$$

The rate of the reactions listed in Eqs. 1-3 is difficult to measure separately by experiments. Therefore, normally, when comparing the cathode performance, we can use the surface exchange coefficient obtained from isotope exchange depth profiling technique. The surface exchange reactions are included following steps:

1. $^{18}O_{2(g)} + 2S_{ad} \leftrightarrow 2\,^{18}O_{2(ad)}$
2. $^{18}O_{2(ad)} + 4e^- \leftrightarrow 2\,^{18}O_{(ad)}^{2-}$
3. $^{18}O_{(ad)}^{2-} + V_O^- \leftrightarrow ^{18}O_O^x + S_{ad}$
4. $^{16}O_O^x + S_{ad} \leftrightarrow ^{16}O_{(ad)}^{2-} + V_O^-$
5. $2\,^{16}O_{(ad)}^{2-} \leftrightarrow ^{16}O_{2(ad)} + 4e^-$ Total Isotope Exchange Reaction: $^{16}O_{2(g)} \leftrightarrow ^{18}O_{2(g)}$ The isotope exchange process combines all oxygen adsorption, oxygen dissociation and oxygen incorporation together. Therefore, the surface exchange coefficient obtained from this experiment helps to discover which materials have higher reaction rates.

An isotope exchange experiment was performed in a Xe and Ar irradiated YSZ electrolyte. The surface exchange coefficient (K) obtained is about one order of magnitude higher than non-irradiated YSZ controlled sample at 250° C. The results suggest that the ion irradiation may enhance the surface exchange properties (i.e. increase the oxygen adsorption, oxygen dissociation and oxygen incorporation rates at the surface of electrolyte or the interface between electrolyte and cathode layer).

The surface exchange enhancement in irradiated samples could arise from the increase of adsorption sites due to surface damage from the ion irradiation even though the damage is at an atomic scale. Some atomic scale steps could form on the surface of irradiated electrolyte.

The enhancement of oxygen incorporation comes from increase in the oxygen vacancies supply in the dislocation core. Furthermore, the electronic structure change around the dislocation core may improve the electron transfer to the oxygen gas in the dissociation process.

Pt is commonly as catalyst used in Proton Exchange Membrane fuel cells. For low operating temperature solid oxide fuel cells, Pt can also be used as metal cathode layer. Isotope experiments have been done after deposition of a porous Pt catalyst that is about 30 nm in thickness to the surface of irradiated electrolyte. There were some problems in temperature measurement in the experiments in addition to a Pt adhesion problem. However, according to the result at 300° C., the surface exchange coefficient of irradiated sample is approximately one order of magnitude higher than that of the non-irradiate samples. This suggests that the enhancement arise mainly from the irradiated interface of catalyst and electrolyte.

The study by T. Horita et al. (Power Sources, 106, pages 224-240 (2002)) suggests that in metal cathode, the active zone site for oxygen incorporation is only at triple phase boundary (TPB). The ion irradiation at the metal-electrolyte interface could introduce higher oxygen incorporate at the TPB and increase oxygen ion flux into the electrolyte.

In addition, the cathode materials used in intermediate and high temperature solid oxide fuel cell such as LSCF and LSM can also be improved by the ion irradiation with the same reason as the case of electrolyte interface. Therefore, not only can ion irradiation improve the oxygen incorporation in the interface of electrode-electrolyte, but the electrode itself can also be improved. The major difference between metal and mixed ionic-electronic electrodes is the active zone for the oxygen incorporation. Mixed ionic-electronic electrodes can have oxygen ion diffusion to electrolyte interface in the region beyond the triple phase boundary.

The reactions in the mixed ionic-electronic electronic electrodes are more complicated than those of the metal electrode because oxygen incorporation and oxygen diffusion in the mixed ionic-electronic electrode needs to be considered. All processes could happen at the same time, which causes the mixed ionic-electronic electrode to have more advantages over the metal electrode. As suggested by T. Horita et al., the active zone for oxygen incorporation in LSM or LSCF is extended beyond the TPB. However, the rates of oxygen incorporation and oxygen diffusion in part beyond TPB are usually lower than those at the triple phase boundary. If one can improve those rates, the active zone of the oxygen incorporation into electrolyte will be larger and yield higher oxygen ion flux into the solid oxide fuel cell.

Therefore, by ion irradiation at the mixed ionic-electronic electrode, the dislocations introduced could enhance the oxygen diffusion by increasing the oxygen vacancies and reducing the migration energy. Furthermore, similar to electrolyte interface after ion irradiation, the adsorption sites for oxygen gas may be increased. The oxygen incorporation may be enhanced with an increase of oxygen vacancy concentration. However, the limitation could be the oxygen incorporation from mixed ionic-electronic into electrolyte structure. To further enhance the effect, the interface can be irradiated so that the all electrolyte interface becomes the active area.

The solid oxide fuel cell (SOFC) has a cathode, an electrolyte membrane that selectively transports oxygen ions, and an anode. Some SOFCs also use current collectors, depending on the configuration and the materials used. The oxygen ion transport rate through the electrolyte can be influenced by oxygen adsorption, dissociation and incorporation.

Experiments have shown that ion irradiation of the electrolyte can increase oxygen ion transport rates by an order of magnitude. Ions selected for irradiation include Ar, Ce, H, He, Kr, Na, Ne, Xe, and Zr. Neutrons and electrons may also be used. One or more types of irradiation may be used on a given element. The irradiation can produce dislocations in the material being irradiated. By annealing the material, the dislocations may continually extend from one surface of the material to an opposite surface of the material. Dislocation densities of at least $10^{10}$ cm/cm$^3$ have been shown to effectively improve oxygen ion transport. It has also been observed that higher densities have higher transport rates. Therefore, dislocation densities of at least $10^{11}$ cm/cm$^3$, $10^{12}$ cm/cm$^3$, $10^{13}$ cm/cm$^3$, and so on are increasingly more desirable. Depending upon the desired outcome, the dislocations may also extend inward from a surface. In this case, the dislocation density will refer to the volume that is affected by the irradiation and annealing process.

As discussed above, a triple phase boundary exists at the intersection of a non-continuous cathode and an electrolyte. Experiments have shown that the oxygen ion transport rate is highest at the triple phase boundary. Therefore, by using a porous cathode (or a cathode geometry such as islands, lines, or grids, among others) one can create TPB areas that contribute to the increase of oxygen ion transport.

The cathode used in the SOFC may be metal, cermet, or a mixed ionic-electronic material. Examples of metal cathodes include Pt, Ag, Ni, and their alloys. Cermet is a well known material comprising a ceramic and metal. A cermet is ideally designed to have the optimal properties of both a ceramic, such as high temperature resistance and hardness, and those of a metal, such as the ability to undergo plastic deformation or conduct electricity. The metal is used as a binder for an oxide, boride, carbide, or alumina. Generally, the metallic elements used are nickel, molybdenum, and cobalt. Depending on the physical structure of the material, cermets can also be metal matrix composites, but cermets are usually less than 20% metal by volume. Mixed ionic-electronic materials such as doped lanthanum ferrite and doped lanthanum manganate are appropriate choices for a cathode. Specific examples include Sr—Co doped LaFeO$_3$ and Sr doped LaMnO$_3$.

It has been observed that the surface orientation of the electrolyte affects the oxygen transport rate. Electrolyte surface orientations of (110) and (100) are beneficial relative to other orientations. Suitable choices for the solid oxide electrolyte include YSZ, Sc stabilized Zirconia (SSZ), Ca stabilized Zirconia (CSZ), Gd-doped Ceria, Sm-doped Ceria, and Y-doped Ceria.

Additionally, the ion irradiation could possibly enhance the anode reactions as well. The anode reactions are believed to compose of several steps as follows:

Hydrogen Adsorption/Desorption:

$H_2(ad) + S_{ad} \leftrightarrow 2H(ad)$

O moves from bulk to adsorption sites/Incorporation $O_O^x + S_{ad} \leftrightarrow O_{(ad)} + V_O^- + 2e^-$ Hydroxyl Formation/Dissociation $O_{(ad)} + H_{(ad)} \leftrightarrow OH_{(ad)}$ Water Formation/Dissociation $2OH_{(ad)} \leftrightarrow H_2O_{(ad)} + O_{(ad)}$ $OH_{(ad)} + H_{(ad)} \leftrightarrow H_2O_{(ad)}$ Water Desorption $H_2O_{(ad)} \leftrightarrow H_2O_{(g)}$ For reasons similar to the mixed-ionic-electronic cathode, by ion irradiation, the dislocations introduced can enhance the oxygen diffusion by increasing the oxygen vacancies and reducing the migration energy. Therefore, this can enhance the oxygen migration from bulk to the adsorption sites. Furthermore, the irradiation can also increase the adsorption sites for O and H on the anode which in turn can enhance all above reactions. The surface exchange coefficient of the anode may be increased by irradiation.

The anode used in the SOFC may be metal, cermet, or a mixed ionic-electronic material. However, the conventional anode material used nowadays is Ni/YSZ cermet. Pt, Ag, Ni, or their alloys can also be used.

One example of a preferred embodiment of the solid oxide fuel cell follows. The fuel cell composed of Pt/Ag alloyed or any alloy of Pt/Ag/Ni at the cathode. The thickness of the cathode is desirably less than the irradiated ion penetration depth (for example, less than 100 nm for 125 keV $Ar^+$ at dose $2 \times 10^{16}$ ions/$cm^2$). The dislocations of approximately $10^{12}$ $cm^{-2}$ are then introduced in the cathode. YSZ or GDC may then deposited as electrolyte material on the irradiated cathode with thickness less than 100 nm. The electrolyte may then be irradiated with 125 keV $Ar^+$ at dose $2 \times 10^{16}$ ions/$cm^2$. Ni/YSZ cermet or Pt/Ag/Ni alloy are then deposited as the anode materials and are optionally irradiated with $Ar^+$. The thickness of anode is desirably less than the penetration depth of $Ar^+$. After each step of ion irradiation, the sample is desirably annealed at temperature of at least 800° C. for at least 3 hours to relax the dislocation structures such that the dislocation can straighten throughout the thin film.

Figure 1B:
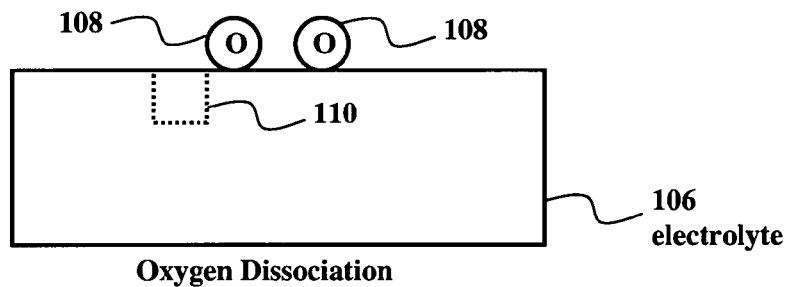
Figure 1C:
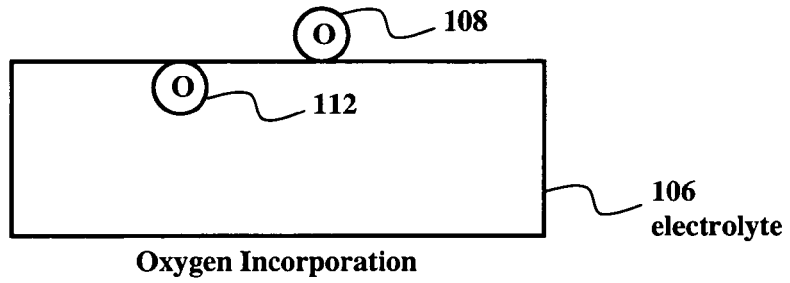

FIGS. 1A-C show examples of oxygen adsorption, dissociation and incorporation. FIG. 1A shows an oxygen molecule 102, a surface adsorbed oxygen molecule 104, and an electrolyte 106 that has oxygen vacancies 110. FIG. 1B shows dissociated oxygen 108 on the surface of the electrolyte 106. FIG. 1C shows incorporated oxygen 112 in the electrolyte 106.

Figure 2A:
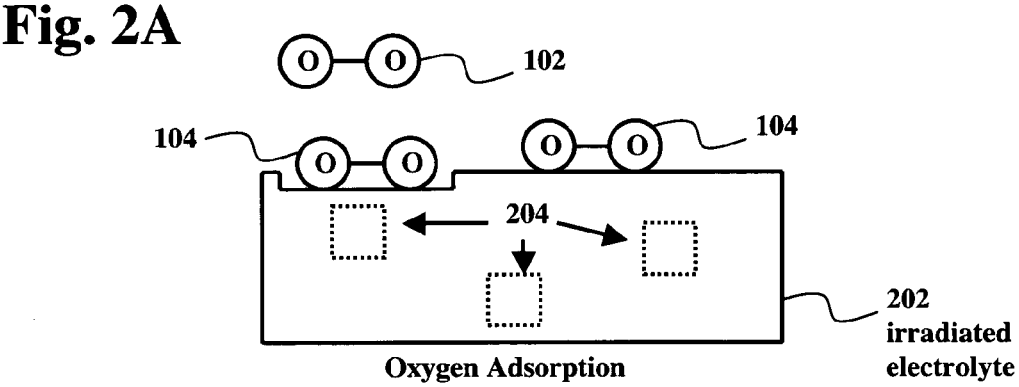
FIGS. 2 A-C show examples of oxygen adsorption, dissociation and incorporation with an irradiated electrolyte.
Figure 2B:
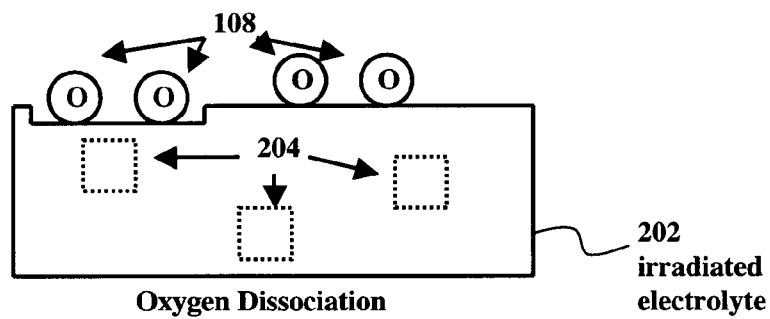
Figure 2C:
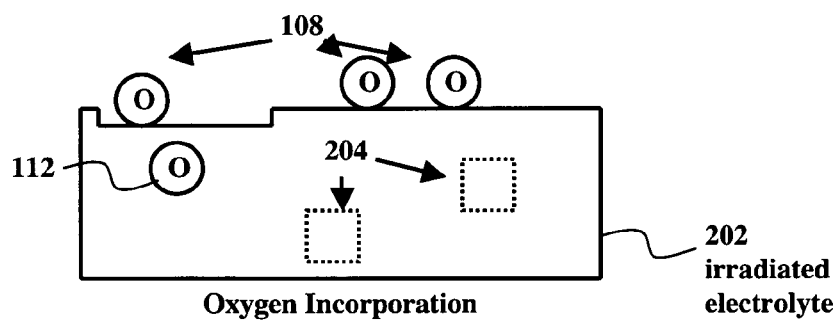

FIGS. 2A-C show examples of oxygen adsorption, dissociation and incorporation with an irradiated electrolyte. FIG. 2A shows an oxygen molecule 102, a surface adsorbed oxygen molecule 104, and an irradiated electrolyte 202 that has oxygen vacancies 204. FIG. 2B shows dissociated oxygen 108 on the surface of the electrolyte 202. FIG. 1C shows incorporated oxygen 112 in the electrolyte 202.

Figure 3A:
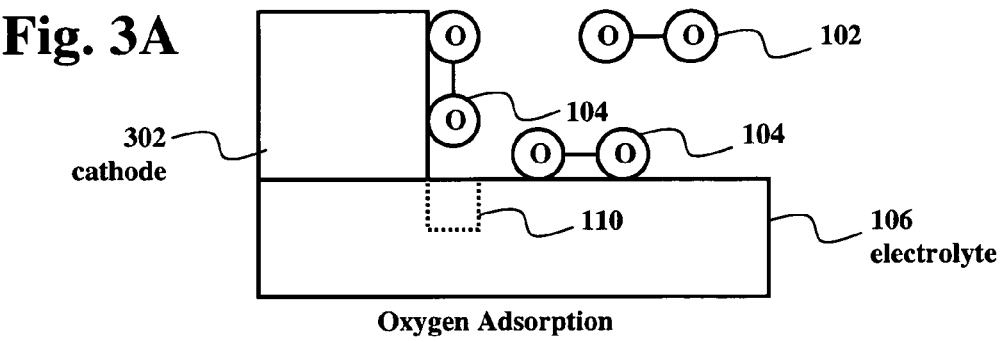
FIGS. 3 A-C show examples of oxygen adsorption, dissociation and incorporation at a triple phase boundary.
Figure 3B:
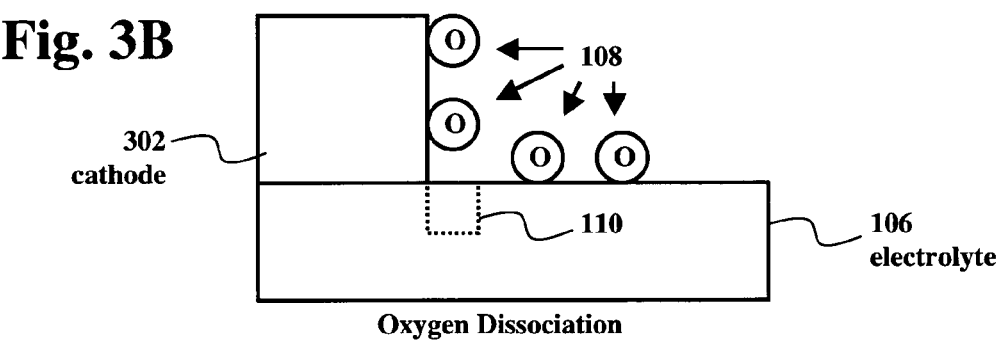
Figure 3C:
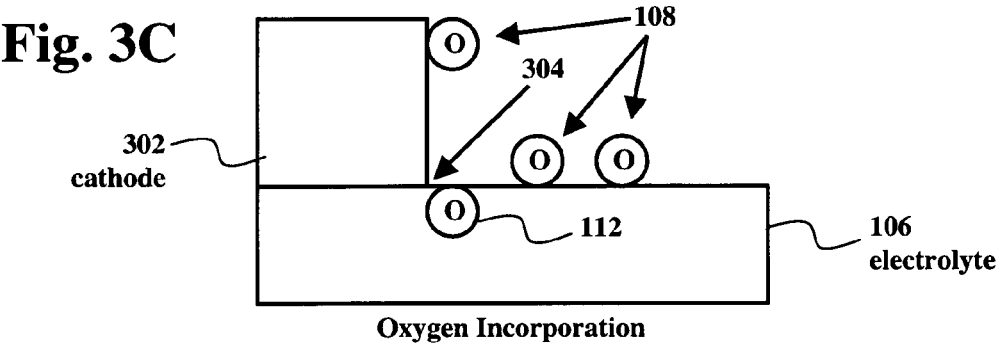

FIGS. 3A-C show examples of oxygen adsorption, dissociation and incorporation at a triple phase boundary. FIG. 3A shows an oxygen molecule 102, a surface adsorbed oxygen molecule 104, an electrolyte 106 that has oxygen vacancies 110, and a cathode 302. FIG. 3B shows dissociated oxygen 108 on the surface of the electrolyte 106 and cathode 302. FIG. 3C shows incorporated oxygen 112 in the electrolyte 202. Also shown is the triple phase boundary (TPB) 304.

Figure 4A:
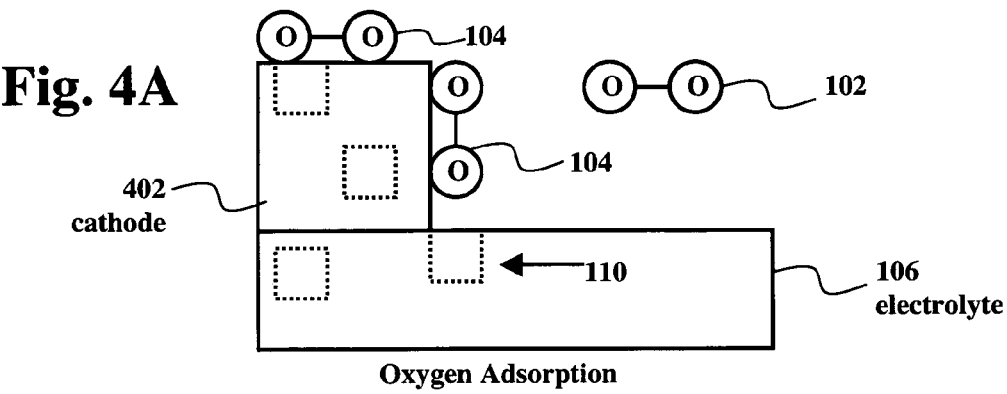
FIGS. 4 A-C show examples of oxygen adsorption, dissociation and incorporation into a cathode FIGS. 5 A-C show examples of oxygen adsorption, dissociation and incorporation in different combinations of irradiated cathodes and/or electrolytes.
Figure 4B:
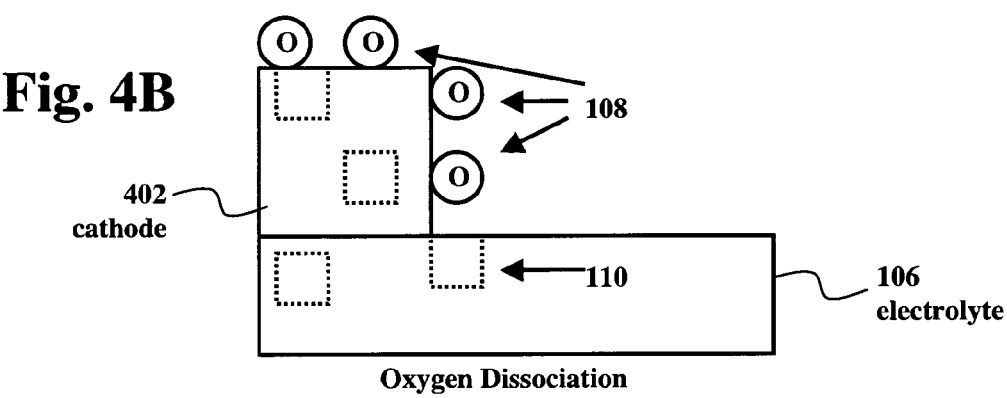
Figure 4C:
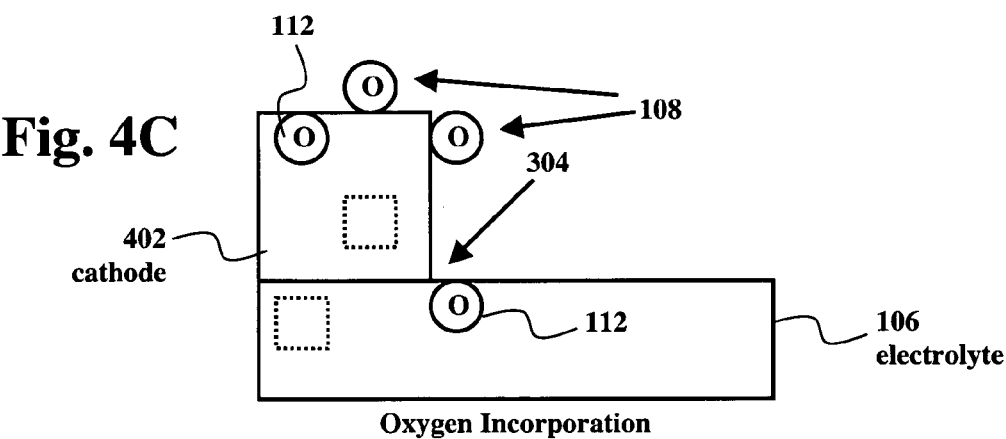

FIGS. 4A-C show examples of oxygen adsorption, dissociation and incorporation into a cathode. FIG. 4A shows an oxygen molecule 102, a surface adsorbed oxygen molecule 104, an electrolyte 106, a cathode 402, and oxygen vacancies 110 in the electrolyte 106 and cathode 402. FIG. 4B shows dissociated oxygen 108 on the surface of the cathode 402.

FIG. 4C shows incorporated oxygen 112 in the cathode 402 and the electrolyte 106. Also shown is the triple phase boundary (TPB) 304.

The oxygen ions have three ways of incorporating into the electrolyte 106. The first is direct incorporation as seen in FIG. 1C. The second is incorporation at the TPB 304 as seen in FIGS. 3C and 4C. The third is incorporation into the cathode as seen in FIG. 4C, followed by migration of the oxygen ions across the interface of the cathode 402 and the electrolyte 106 into the electrolyte 106. Thus, the last example is incorporation into the electrolyte membrane 106 at an interface between the cathode 402 and the electrolyte membrane 106. All three examples may occur with a non-irradiated electrolyte 106 or an irradiated electrolyte 202.

Figure 5A:
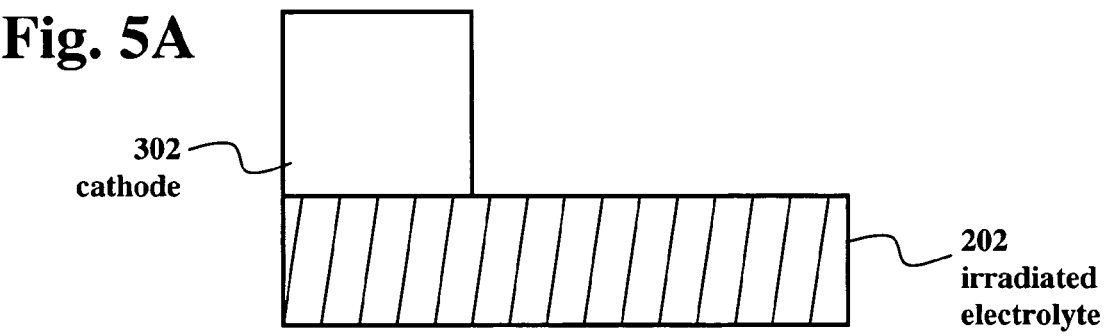
Figure 5B:
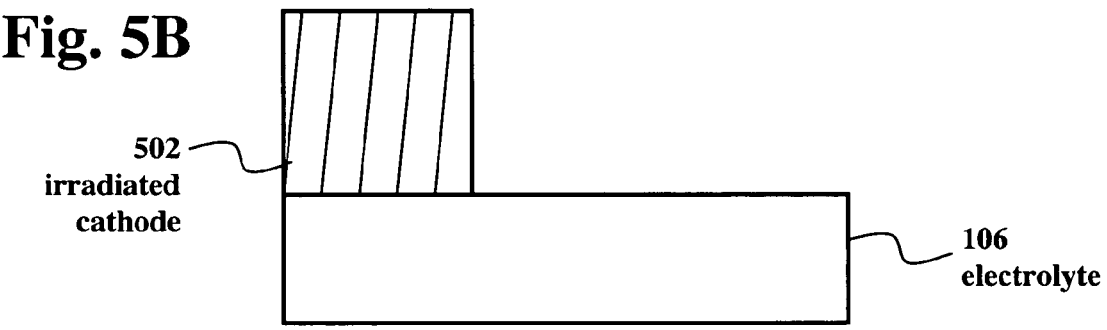
Figure 5C:
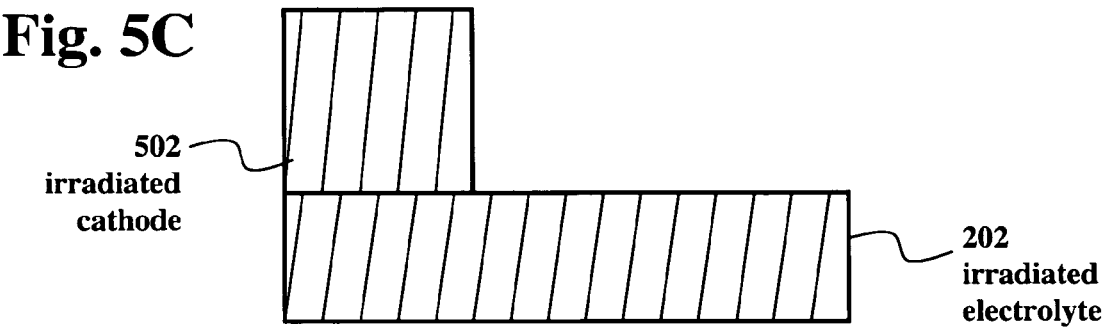

FIGS. 5A-C show examples of oxygen adsorption, dissociation and incorporation in different combinations of irradiated cathodes and/or electrolytes.

FIG. 5A shows an irradiated electrolyte 202 and a cathode 302.

FIG. 5B shows an electrolyte 106 and an irradiated cathode 502. FIG. 5C shows an irradiated electrolyte 202 and an irradiated cathode 502.

Figure 6A:
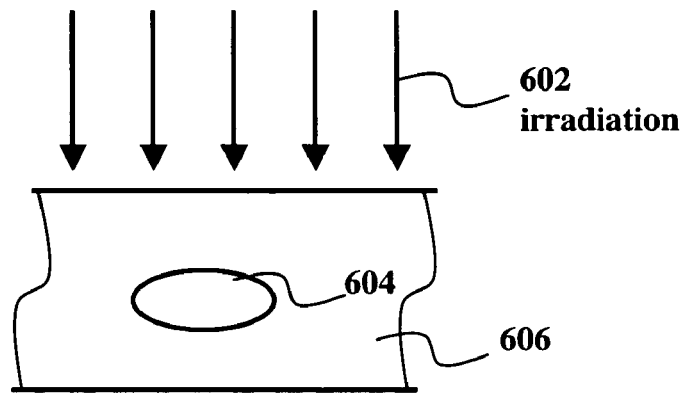
FIGS. 6 A-C show an example of how irradiation and annealing create dislocations that continuously extend from one surface to an opposite surface.
Figure 6B:
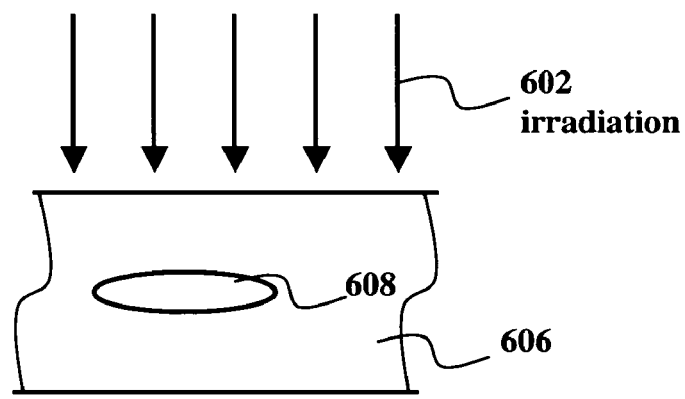
Figure 6C:
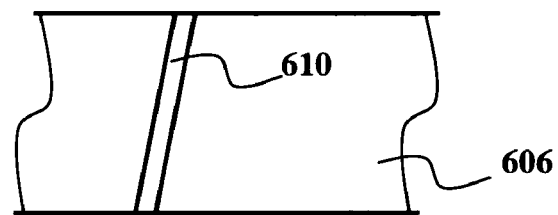

FIGS. 6A-C show an example of how irradiation and annealing create dislocations that continuously extend from one surface to an opposite surface. FIG. 6A shows a target 606 being subjected to ion, electron, and/or neutron irradiation 602 such that vacancy clusters 604 grow to a critical size. FIG. 6B shows the target 606 being subjected to more ion, electron, and/or neutron irradiation 602 such the atomic lattice structure collapses, thereby forming Frank dislocation loops 608. FIG. 6C shows the target 606 after it has been annealed. The heat treatment allows the Frank dislocation loops to reorient, forming continuous dislocations 610 from one surface to another. For clarity, only one continuous dislocation 610 is shown even though there will obviously be many more than one.

Figure 7A:
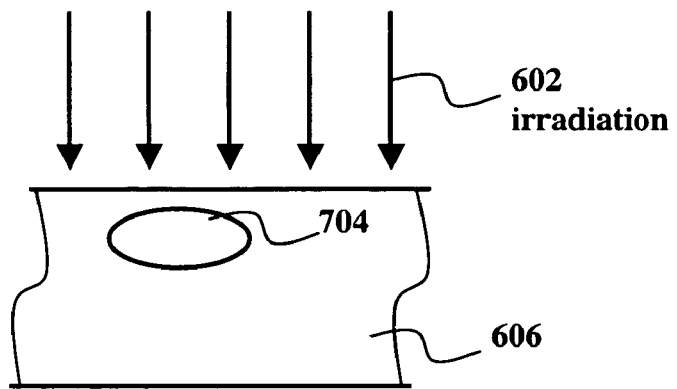
FIGS. 7 A-C show an example of how irradiation and annealing create dislocations extending inward from one surface.
Figure 7B:
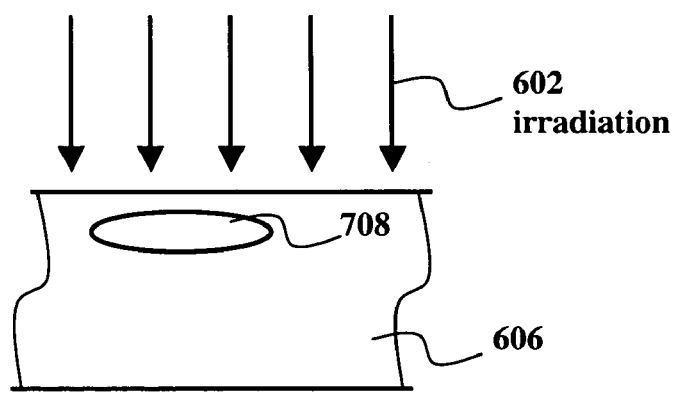
Figure 7C:
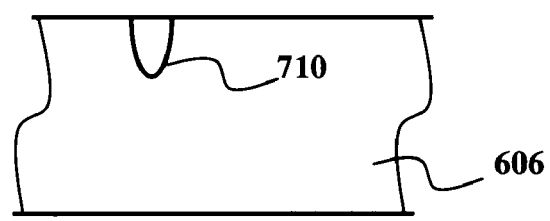

FIGS. 7A-C show an example of how irradiation and annealing create dislocations extending inward from one surface. FIG. 7A shows a target 606 being subjected to ion, electron, and/or neutron irradiation 602 such that vacancy clusters 704 grow to a critical size. FIG. 7B shows the target 606 being subjected to more ion, electron, and/or neutron irradiation 602 such the atomic lattice structure collapses, thereby forming Frank dislocation loops 708. FIG. 7C shows the target 606 after it has been annealed. The heat treatment allows the Frank dislocation loops to reorient, forming dislocations 710 extending inward from one surface. For clarity, only one dislocation 710 is shown even though there will obviously be many more than one.

It will be apparent to one skilled in the art that the described embodiments may be altered in many ways without departing from the spirit and scope of the invention. Accordingly, the scope of the invention should be determined by the following claims and their equivalents.

What is claimed is:

1. A solid oxide fuel cell comprising:
   an anode;
   an electrolyte membrane, the electrolyte membrane selectively transporting oxygen ions; and
   a cathode,
   where the electrolyte membrane is irradiated so that oxygen adsorption, oxygen dissociation, and oxygen incorporation are increased,
   where the electrolyte membrane is irradiated with one of a group consisting of ions, electrons, and neutrons, where the cathode is irradiated so that oxygen adsorption, oxygen dissociation, and oxygen incorporation are increased, where the cathode is irradiated with one of a group consisting of ions, electrons, and neutrons.

2. The fuel cell of claim 1, where ions are used for the irradiation of the electrolyte membrane, and where the ions used for the irradiation of the electrolyte membrane are selected from a group consisting of Ar, Xe, H, He, Ne, Kr, Na, Zr, and Ce.

3. The fuel cell of claim 1, where the cathode comprises a metal, and where a triple phase boundary exists at the interface between the electrolyte membrane and the cathode.

4. The fuel cell of claim 3, where the cathode comprises a material from a group consisting of Pt, Ag, Ni, and their alloys.

5. The fuel cell of claim 3, where oxygen incorporation into the electrolyte membrane occurs at the triple phase boundary.

6. The fuel cell of claim 1, where the cathode comprises cermet.

7. The fuel cell of claim 1, where the cathode comprises a mixed ionic-electronic material from a group consisting of doped lanthanum ferrite and doped lanthanum manganate, and where a triple phase boundary exists at the interface between the electrolyte membrane and the cathode.

8. The fuel cell of claim 7, where the cathode comprises Sr—Co doped $LaFeO_3$.

9. The fuel cell of claim 7, where the cathode comprises Sr doped $LaMnO_3$.

10. The fuel cell of claim 1, where oxygen incorporation into the electrolyte membrane occurs at an interface between the cathode and the electrolyte membrane.

11. The fuel cell of claim 1, where the electrolyte membrane has a surface orientation of (110).

12. The fuel cell of claim 1, where the electrolyte membrane has a surface orientation of (100).

13. The fuel cell of claim 1, where the electrolyte membrane has a dislocation density of at least $10^{10}$ cm/cm$^3$.

14. The fuel cell of claim 13, where the dislocations continuously extend from a cathode interface to an anode interface.

15. The fuel cell of claim 1, where the electrolyte membrane is selected from a group consisting of YSZ, Sc stabilized Zirconia (SSZ), Ca stabilized Zirconia (CSZ), Gd-doped Ceria, Sm-doped Ceria, and Y-doped Ceria.

16. The fuel cell of claim 1, where the anode is irradiated with one of a group consisting of ions, electrons, and neutrons.

17. A solid oxide fuel cell comprising:

an anode;

an electrolyte membrane, the electrolyte membrane selectively transporting oxygen ions; and a cathode, where the cathode is irradiated so that oxygen adsorption, oxygen dissociation, and oxygen incorporation are increased, where the cathode is irradiated with one of a group consisting of ions, electrons, and neutrons.

18. The fuel cell of claim 17, where the cathode comprises a metal, and where a triple phase boundary exists at the interface between the electrolyte membrane and the cathode.

19. The fuel cell of claim 17, where the cathode comprises cermet.

20. The fuel cell of claim 17, where the cathode comprises a mixed ionic-electronic material from a group consisting of doped lanthanum ferrite and doped lanthanum manganate, and where a triple phase boundary exists at the interface between the electrolyte membrane and the cathode.

* * * * *